Sept. 1, 1964  R. R. BOLLMAN  3,146,647
AUTOMATIC COPYING LATHE
Filed Jan. 16, 1963  4 Sheets-Sheet 1

INVENTOR.
RALPH R. BOLLMAN
BY
ATTORNEYS

Sept. 1, 1964  R. R. BOLLMAN  3,146,647
AUTOMATIC COPYING LATHE
Filed Jan. 16, 1963  4 Sheets-Sheet 2

Sept. 1, 1964    R. R. BOLLMAN    3,146,647
AUTOMATIC COPYING LATHE
Filed Jan. 16, 1963    4 Sheets-Sheet 4

United States Patent Office 3,146,647
Patented Sept. 1, 1964

3,146,647
AUTOMATIC COPYING LATHE
Ralph R. Bollman, Cincinnati, Ohio, assignor to The Cincinnati Milling Machine Co., Cincinnati, Ohio, a corporation of Ohio
Filed Jan. 16, 1963, Ser. No. 251,881
1 Claim. (Cl. 82—14)

This invention relates to automatic copying lathes and more particularly to a dual cycle control mechanism adapted to produce a rough cut and a finish cut in an automatically controlled machining operation.

It is an object of this invention to provide a single template tracing mechanism for a lathe wherein a rough cut and a finish cut are obtained automatically by a control mechanism having a minimum of changing relationships occurring between the rough and finish cuts.

Another object of this invention is to provide a reliable but inexpensive dual cycle control mechanism for a lathe.

Also an object of this invention is the provision of a simple mechanism to change the distance relationships between the cutting edge of a tool and the tracing stylus in a template tracing mechanism on a lathe to effect rough and finish cutting operations.

A more specific object of this invention is to provide a lathe with a dual cycle control mechanism in which automatic substitution of template tracing styluses can be made to produce successive rough and finish cutting operations.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claim, without departing from or exceeding the spirit of the invention.

In the preferred form of this invention, a hydraulic tracing mechanism is utilized having a stem extending therefrom, the deflection of which results in a shift of a piston. The piston is linked to a tool holder which is shifted relative to a workpiece by the movement of the piston in a cylinder. The deflection of the stem is determined by the contour of a template along which a stylus is moved during use of the machine. The stylus extends from the tracer mechanism stem. By this invention the stem carries more than one stylus which provides in effect more than one template engaging surface on the stem and a substitution of syluses can be made, the effect of which is to change the distance relationship between the cutting edge of a tool and the styluses as they engage the template.

A clear understanding of the construction and operation of this invention can be obtained from the following detailed description in which reference is made to the attached drawings wherein.

Figure 1:
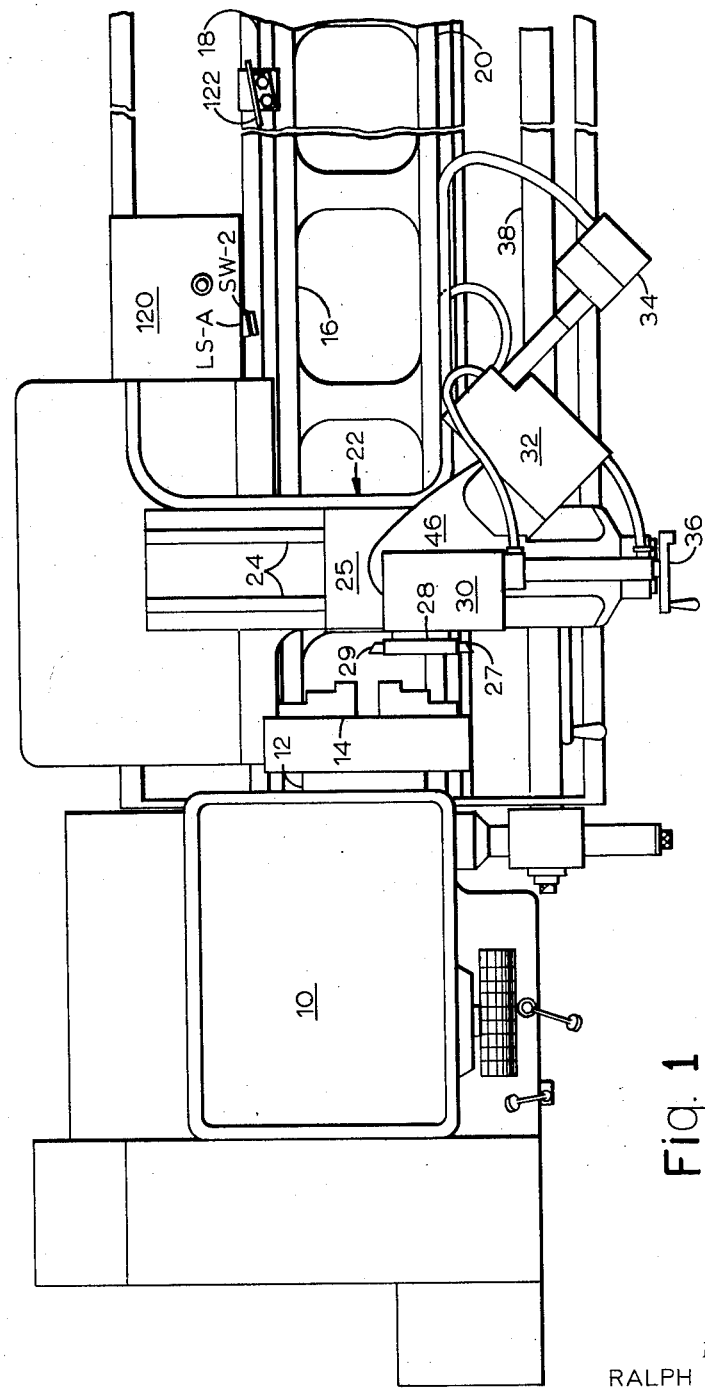
FIG. 1 is a partial plan view of a lathe.
Figure 4:
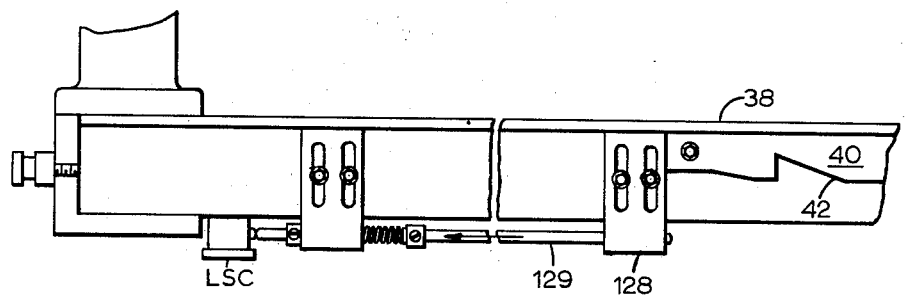
FIG. 4 is an enlarged portion of the lathe as viewed in FIG. 1.

The plan view in FIG. 1 shows an engine lathe having a headstock 10 with a rotatable spindle 12 adapted to hold a workpiece in its jaws 14. A bed 16 extends from the headstock 10 and parallel ways 18, 20 are formed on top of the bed 16 to slidably receive a saddle unit 22 for movement toward and away from the headstock 10. A pair of cross slide ways 24 is formed on top of the saddle unit 22 to slidably support a cross slide 25 on which a tracing attachment mechanism is mounted. The tracing mechanism (shown also in FIG. 2) is comprised of a tool holder 28 having tools, including a roughening tool 29 and a finishing tool 27 fixed therein, a tool holder index mechanism 30 and a hydraulic tracer unit 32 including a control housing 34. The entire tracer mechanism is adjustable on the saddle cross slide ways 24 by operation of a handwheel and screw mechanism 36. In addition, the hydraulic tracer unit 32 operates to move a slide 46 on which the tool holder 28 and index mechanism 30 are mounted at an angle across the cross slide ways 24 toward and away from the axis on which the spindle 12 rotates. The index mechanism 30 which rotates the tool holder 28 from position to position is powered by a piston and cylinder motor 31, FIG. 6, which indexes the tool holder 28 one position for each reciprocation of the piston rod 33. The motor 31 is controlled by a two position, single solenoid valve 35 having the solenoid G–SOL connected thereto. A template bar 38 is attached to the bed 16 and extends longitudinally parallel to the ways 18, 20. The template bar 38 is adapted to support a template 40 (FIG. 4) having a contour 42 therealong which is to be duplicated by the automatic operation of the lathe. A stylus 44 extends downward from the control housing 34 (see FIG. 5) to engage the template 40 and the hydraulic unit is operated in response to deflections of the stylus 44 to cause the tool holder 28 to be moved in such a way as to reproduce the contour 42 on a workpiece 45 (FIG. 6) held in the jaws 14 between the headstock 10 and a tailstock 47 and rotated by the spindle 16 as the saddle 22 is moved toward the headstock 10 on the ways 18.

As described, the tool holder 28 and index mechanism 30 are fixed on the slide member 46 which is movable reciprocally at an angle to the ways 24 on the cross slide 25. The hydraulic tracing unit 32 with the control housing mechanism 34 which controls the movement of the slide 46 is shown schematically in FIG. 6. Movement of the slide 46 is accomplished by the operation of a fluid motor which includes a cylinder 48 formed in the unit 32 and a piston 50 that is fixed to the cross slide 25 by a bracket 51. The motor 48, 50 is operated reciprocally on the principle of differential piston areas. Fluid under pressure from a pump 52 is constantly connected through a flexible line 54 around a valve plunger 56 and through a passage 58 to the smaller area side of the piston 50. The connection of fluid under pressure from the line 54 to a line 62 that communicates with the larger area side of the piston 50 is controlled by the position of the plunger 56. An adjusting screw 64 is set to hold the plunger 56 against the bias force of a spring 66 in the position shown where a low pressure return line 68 is blocked from the line 62 and pressure from the line 54 is connected thereto so that normally the piston 50 is located in the cylinder 48 as shown with the slide 46 extending toward the workpiece 45. A lever 70 having a ball end 72 received between the plunger 56 and the adjusting screw 64 is received in the mechanism for movement around a pivot 74. The screw 64 limits the pivotal movement of the lever 70 in one direction and the bias spring 66 tends to oppose its movement in the other direction. A tracer stem 76 is received in the control housing 34 for pivot on the balls 78 at a fixed location relative to the slide 46. A ball 80 is received between notches in the lever 70 and stem 76 and with any pivotal movement of the stem 76 from the position shown, the lever 70 is pivoted to move the plunger 56 away from the screw 64 against the bias of the spring 66. This causes the line 54 to be disconnected from the line 62 and causes the return line 68 to be connected to line 62 to allow the piston and cylinder motor to move the slide 46 back away from the workpiece 45. The stylus 44 which is adapted to engage the template 40 is fixed in the end of the stem 76 and extends therefrom. Since the normal condition of the hydraulic tracer circuit is to shift the slide 46 to carry the mechanism, including the control housing 34 from which the stylus 44 extends toward the workpiece 45, as soon as the stylus 44 engages the template 40 the plunger 56 is shifted due to lateral deflection of the stylus causing the stem 76 to pivot. The tracing mechanism will then function in a well known manner to maintain the stylus 44 in contact with the template 40 and changes in its contour will produce corresponding shifts in the position of the slide 46 so that as the saddle 22 is moved along the ways 18, 20 the turning tools 27, 29 in the tool holder 28 will duplicate the template contour 42 on the workpiece 60.

Figure 3:
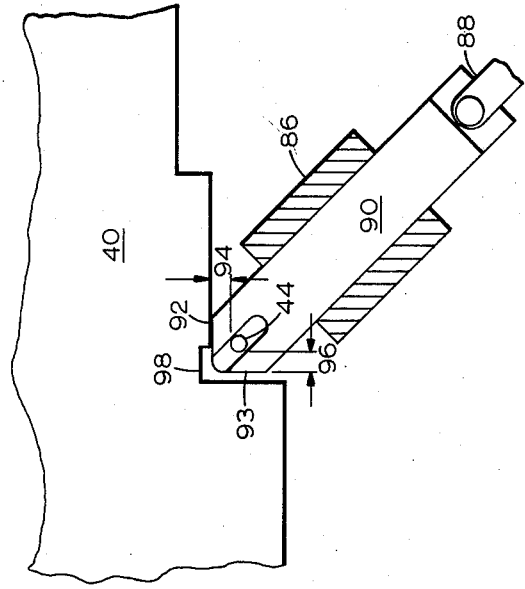
FIG. 3 is an enlarged view of a compound tracing stylus.
Figure 5:
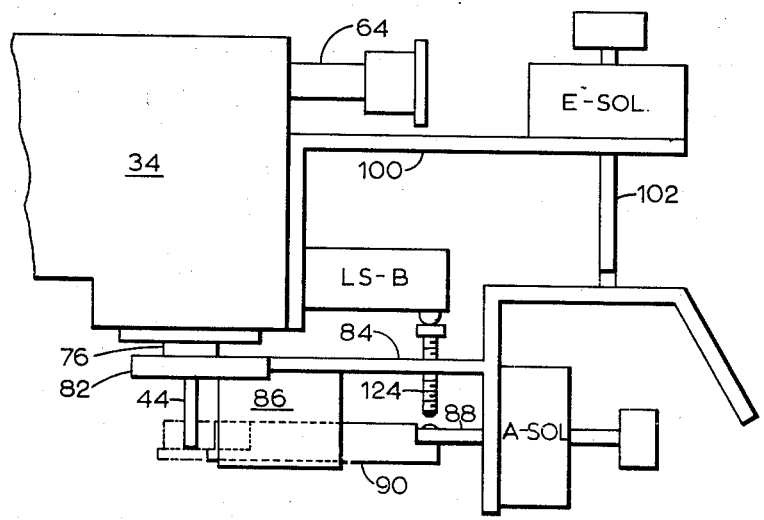
FIG. 5 is an enlarged view of a portion of a template tracing mechanism viewed in elevation with a cover removed.

The manner in which a substitution of styluses is made to render each of two styluses operative in the tracing mechanism described is shown in FIGS. 3 and 5. The stem 76 extends downward from the control housing 34 at a fixed location relative to and spaced from the tool holder 28. The tracing stylus 44 which can be termed a fine stylus for accurate reproducing of the template 40 extends directly downward from the stem 76. A collar 82 is fixed around the lower end of the stem 76 and a bracket 84 extends laterally from the collar 82. A block 86 is fixed on the lower side of the bracket 84 and a coarse tracing stylus 90 used for rough cutting is slidably received therethrough. A solenoid A–SOL is fixed to the bracket 84 and its plunger 88 is connected to the coarse stylus 90. When the solenoid A–SOL is energized the coarse stylus 90 is shifted forward and extends around the fine stylus 44 as shown in FIG. 3. The surfaces 92, 93 of the coarse stylus 90 which are adapted to engage the template 40 are off-set by the dimensions 94, 96 from the fine stylus 44 and therefore engage the template 40 before the slide 46 moves to the place at which the fine stylus 44 engages the template 40. The surfaces of the styluses 44, 90 which engage the template 40 differ spacially relative to the tool holder 28 and the tools 27, 29 therein by the dimensions 94, 96. Therefore when the coarse stylus 90 is extended to its operative position to engage the template 40, the slide 46 is stopped at a location in which the tool holder is moved along a locus off-set from the locus of movement when the finish stylus 44 is operative and the workpiece 45 is turned oversize on its radius by an amount equal to the dimensions 94, 96. It can be seen that the surfaces 92, 93 which engage the template 40 are large enough that all surfaces of the template 40 will not be accurately reproduced, for example, the notch 98 which will produce a small neck on a finished workpiece when traced over by the fine stylus 44 but will not result in a neck being so formed during a rough cutting operation using the coarse stylus 90. The rough and finish cutting operations will each produce a workpiece shape of differing accuracy or fidelity relative to the template 90 both in regard to size and contour.

In order that the tool holder 28 be automatically retractable from the workpiece at appropriate times during machine operation, for example at the end of a complete rough and finish cutting operation, mechanism is included with the control housing 34 which will cause the tracing unit to withdraw from the workpiece 45. A bracket 100 extends from the housing 34 above the coarse stylus bracket 84 and a solenoid E–SOL is mounted with its plunger 102 extending toward the bracket 84. When the solenoid E–SOL is energized, the plunger 102 is moved forcefully downward to engage the bracket 84, to cause the stem 76 to pivot in the housing 34 and displace the plunger 56. Thus the pressure line 54 is blocked from the operating line 62 but the return line 68 is connected to the line 62 to cause the slide 46 to be retracted from the workpiece 45. As long as the solenoid E–SOL is energized to cause a deflection of the stem 76, the slide 46 will be retracted from the workpiece 45.

Figure 2:
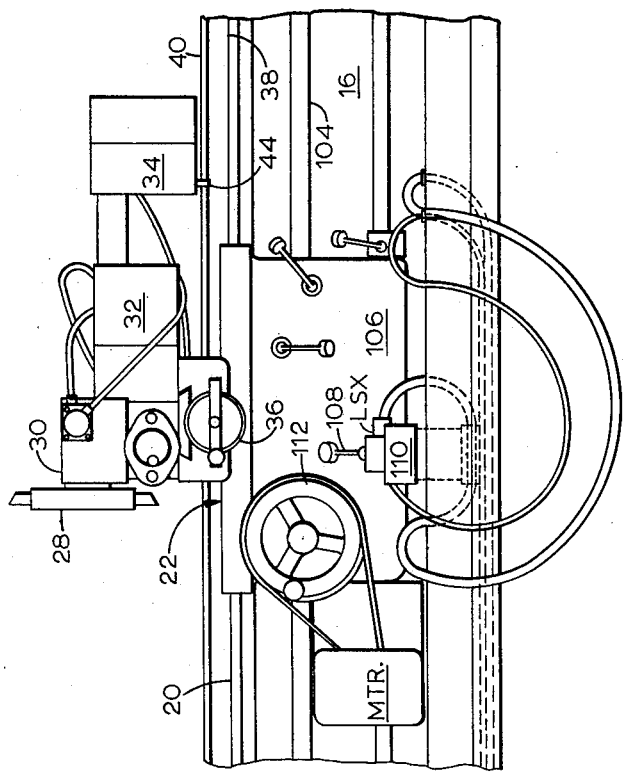
FIG. 2 is a partial front elevational view of a lathe.

The normal feed movement of the saddle 22 toward the headstock 10 is provided conventionally by a drive rod 104, FIG. 2, which extends from the headstock 10 through the apron portion 106 of the saddle 22. The drive rod is rotated and gearing of a conventional nature well known in the machine tool art included in the apron 106 is shiftable to connect the drive rod 104 to cause movement of the saddle 22 through a suitable drive mechanism. A manual control shifter lever 108 is movable from a neutral position upward to a feed position to connect the drive rod 104 to the apron gearing for feed movement of the saddle 22 toward the headstock 10. The tracer attachment mechanism also includes a piston and cylinder motor 110 connected to the lever 108 for movement thereof from the neutral position upward to the feed position, and for return to the neutral position. The motor 110 is operated in response to the selected actuation of a three position, two solenoid valve 111, FIG. 6, by a pair of solenoids B–SOL and C–SOL. A handwheel 112 also is connected to the drive gearing and is rotated when the saddle 22 is moved during feed drive. By rapid rotation of the handwheel 110 when the feed lever 108 is in its neutral position, the saddle 22 can be caused to move at a rapid rate. In the embodiment described, the tracer attachment mechanism also includes an electric motor MTR fixed to the apron 108 and drivingly connected to rotate the handwheel 110 to move the saddle 22 at a rapid rate away from the headstock 10 when energized.

Figure 7:
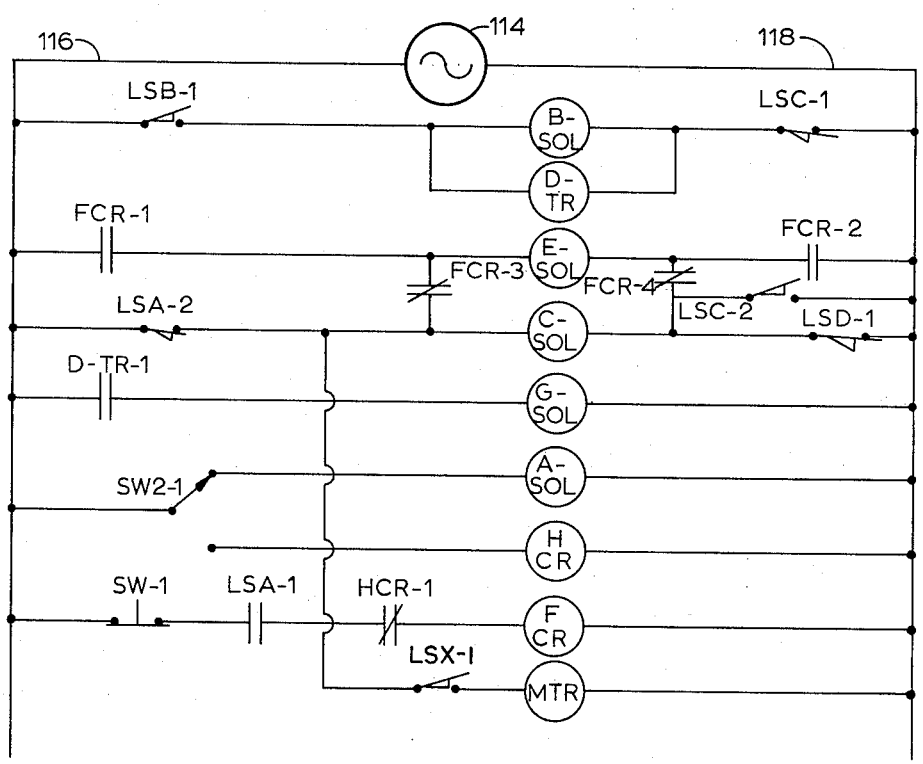
FIG. 7 is a schematic diagram of an electrical control circuit.

The electrical control circuit for an automatic rough and finish cutting operation of the described mechanism is shown in FIG. 7. Control voltage is applied from a source 114 to the power lines 116, 118 across which the electrical control elements are connected. In its initial condition, with the machine connected to an electrical power source and turned on, the control relay FCR is energized through two pairs of normally closed relay contacts HCR–1, SW1 and the contacts LSA1 of the limit switch LSA, FIG. 1. The limit switch LSA is carried in a control box 120 fixed to the saddle 22 and is located in close proximity to another switch SW2 for simultaneous operation by a dog 122 attached to the bed 16 when the saddle 22 is moved back to the end of its travel on the ways 20 away from the headstock 10. In the starting condition the saddle 22 is located in the position where these switches LSA and SW2 are operated. Therefore the relay FCR is initially energized. The contacts FCR–1, FCR–2 are then closed and the solenoid E–SOL is energized to deflect the stem 76 as described and the slide 46 is held retracted. The contacts SW2–1 of the switch SW2 are also in this condition shown to hold the solenoid A–SOL energized. Therefore the coarse tracing stylus 90 is advanced around the fine stylus 44. The switch SW2–1 is an alternate action, push on, push off switch which is shifted to make with two separate circuits alternately as it is operated.

With the circuit initially in the condition described, the dual machining cycle is begun by pushing the start switch SW1 to open the circuit to the relay FCR. The contacts FCR–1 and FCR–2 open while the contacts FCR–3, FCR–4 are closed. Neither of the contacts LSD–1 or LSC–2 are closed at this time so that the solenoid E–SOL is deenergized. The stem 76 is no longer deflected and the tracer mechanism operates to shift the slide 46 until the coarse stylus 90 engages the template 40 to deflect the stem 76. At this same time, the limit switch LSB is operated due to the swing of the stem 66 to carry an adjusting screw 124 received through the bracket 84, into contact therewith to close the contacts LSB–1. The contacts LSC–1 are normally closed and therefore the solenoid B–SOL is energized along with the timer D–TR. The timer D–TR is set but performs no function until deenergized. The solenoid B–SOL shifts the valve 111 to connect pressure from the line 62 to the motor 110 which shifts the piston 126 therein to lift the lever 108 and start the feed movement of the saddle 22. The coarse stylus 90 now is caused to trace along the template 40 to reproduce the contour 42 thereon roughly on the workpiece 45.

Figure 6:
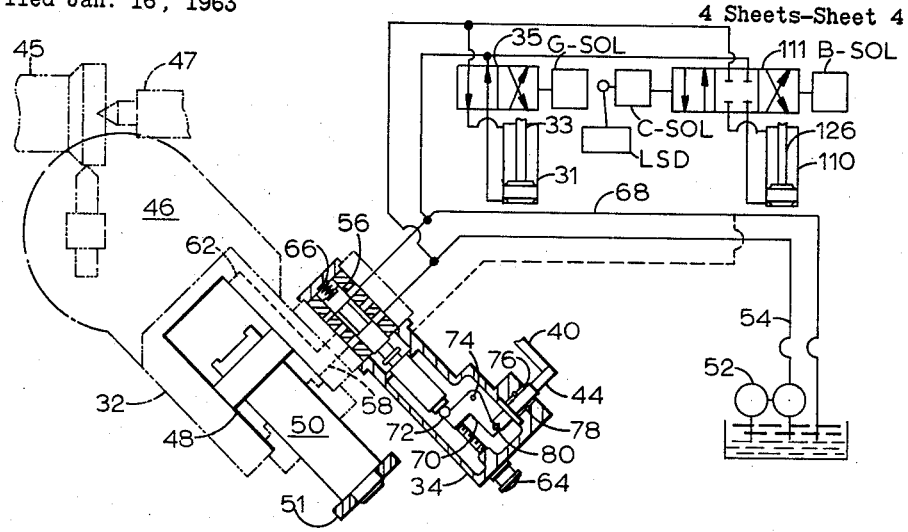
FIG. 6 is a schematic showing of a hydraulic operating circuit.

When the stylus 90 arrives at the end of the template 40, it is caused to be moved on the stop bracket 128 away from the template 40 as in tracing a step in the template. This begins the retraction of the slide 46 and as the stylus 90 contacts the plunger 129 which operates the limit switch LSC on the template bar 38, the contacts LSC–1 are opened to deenergize both the solenoid B–SOL and the timer D–TR. At the same time the contacts LSC–2 are closed and since the dog 122 has now been moved away from the limit switch LSA, the contacts LSA–2 are closed as shown. Therefore a circuit is completed for energizing both the solenoids E–SOL and C–SOL. With the solenoid E–SOL energized, the stem 76 is deflected to retract the slide 46. The solenoid C–SOL energizing shifts the valve 111 from its center position to which it returns when the solenoid B–SOL is deenergized to the position in which it connects the pressure line 62 to the motor 110 to shift the piston rod 110 to the position shown in FIG. 6. A latch switch LSD, FIG. 6, is associated with the solenoid C–SOL and the contacts LSD–1 are allowed to close whenever the solenoid C–SOL is energized. Therefore when the sylus 90 moves off of the switch LSC, the solenoid C–SOL will remain energized. When the motor 110 is operated in this manner, a limit switch LSX, FIG. 2, is operated and its contacts LSX–1 close to energize the motor MTR which drives the handwheel 112 to rapidly return the saddle 22 to its starting position.

At the same time that the timer D–TR is deenergized, the contacts D–TR–1 close to energize the solenoid G–SOL which shifts the valve 35 to connect pressure from the line 62 to extend the piston rod 33. This cocks the index mechanism 30 and after a preset time, the contacts D–TR–1 open again to deenergize the solenoid G–SOL. The valve 35 shifts back to the condition shown and the piston rod 33 is retracted. This indexes the tool turret 28 one position to present the finishing tool 27 for a finishing cut in place of the roughing tool 29. It is pointed out that the tool turret 28 is indexed in a vertical plane on an axis parallel to the axis on which the workpiece 45 is rotated. This allows the machine to index the turret 28 with a shorter retraction stroke and the indexing tools 29 will not interfere with the workpiece 45, the headstock 10 or other structure along the bed 16.

After the tool turret 28 has indexed, the saddle 22 arrives back at its starting position and the dog 122 operates both the switches SW2 and LSA. The contacts LSA–2 are opened to deenergize the solenoids E–SOL and C–SOL as well as the motor MTR and this stops the saddle before the switches SW2 and LSA are carried past the dog 122. At this same time the contacts SW2–1 are shifted to energize the relay HCR and to deenergize the solenoid A–SOL. The coarse stylus 90 is then retracted and the contacts HCR–1 are opened. The stop relay FCR is then prevented from energizing and remaining energized to stop the cycle. Without the relay FCR being energized, the solenoid E–SOL cannot energize and the normal condition of the tracing unit's hydraulic circuit carries the slide 46 back toward the workpiece 45 until the fine stylus 44 engages the template 40 and the switch LSB is then operated to start the feed again in the same manner as during the rough cut. The cycle proceeds now exactly as in the rough cut except that the workpiece 45 is turned to final size and shape. The saddle 22 is returned to where the switches LSA and SW2 are operated after the finish cut is made. Now the contact SW2–1 swings back to energize the solenoid A–SOL and to deenergize the relay HCR. The relay FCR is then energized and its contacts FCR–1 and FCR–2 are closed to energize the solenoid E–SOL which holds the slide 46 retracted. The circuit is in its initial condition again having completed a rough cut cycle and a finish cut cycle in succession. The machine will not begin operation again until the switch SW1 is opened at which time the dual cycle will be repeated automatically.

While this invention has been described in connection with one possible form or embodiment thereof, it is to be understood that the present disclosure is illustrative rather than restrictive and that changes and modifications may be resorted to without departing from the spirit of the invention or the scope of the claim which follows.

What is claimed is:

In a lathe having a bed, a slide member movable relative to said bed and a single template having a profile to be reproduced attached to said bed, a tracing attachment for producing a rough and a finish cut comprising:

(a) a tool holder received on said slide member for movement transverse to the direction of movement of said slide member, (b) a tracting mechanism including a valve having a stem extending therefrom and means for shifting said tool holder in response to deflection of said stem, (c) a fine tracing stylus fixed to said stem and adapted to engage the template to control the deflection of said stem in accordance with the template profile during a finish cut, (d) a bracket fixed to said stem, (e) a coarse tracing stylus movable in said bracket toward and away from said fine stylus, said coarse stylus having a surface thereon interposed between the fine stylus and template when moved toward said fine stylus, said coarse stylus surface adapted to engage the template with substantially more area of contact than said fine stylus for deflection of said stem to produce an approximation of the template profile during a rough cut, (f) a motor fixed on said bracket and connected to said coarse stylus for movement thereof toward and away from said fine stylus, and (g) control means for selectively operating said motor to move said coarse stylus.

References Cited in the file of this patent

UNITED STATES PATENTS 2,913,945     Granberg et al. _____ Nov. 24, 1959

OTHER REFERENCES

Cuppers et al., German printed application, M15942 Ib/49a, May 30, 1956.

Erdmann, German printed application L21248 Ib/49a, Sept. 27, 1956.